United States Patent [19]

Heinonen

[11] Patent Number: 5,239,690
[45] Date of Patent: Aug. 24, 1993

[54] HAND-HELD TRANSCEIVER AS A MODULAR UNIT

[75] Inventor: Jarmo Heinonen, Salo, Finland

[73] Assignee: Nokia Mobile Phones Ltd., Salo, Finland

[21] Appl. No.: 677,399

[22] Filed: Mar. 29, 1991

[30] Foreign Application Priority Data

Mar. 29, 1990 [FI] Finland .................................. 901586

[51] Int. Cl.$^5$ .............................................. H04B 1/04
[52] U.S. Cl. ...................................... 455/89; 455/127; 455/343
[58] Field of Search ................... 455/89, 90, 127, 343, 455/78, 79

[56] References Cited

U.S. PATENT DOCUMENTS

| | | | |
|---|---|---|---|
| 5,033,109 | 7/1991 | Kawano et al. | 455/127 |
| 5,048,117 | 9/1991 | Aisaka et al. | 455/127 |
| 5,054,115 | 10/1991 | Sawa et al. | 455/90 |
| 5,056,153 | 10/1991 | Taniguchi et al. | 455/89 |

Primary Examiner—Reinhard J. Eisenzopf
Assistant Examiner—Edward Urban
Attorney, Agent, or Firm—Darby & Darby

[57] ABSTRACT

A hand-held transceiver comprises a base element and an amplifying element between which there is a defined interface, whereby the beam element may alternatively be connected with the separate amplifier through the above mentioned interface. Due to the modular structure of the hand-held transceiver, it is possible to make a car radio telephone where the hand-held transceiver connected to the amplifier only comprises the base element.

8 Claims, 1 Drawing Sheet

HAND-HELD TRANSCEIVER AS A MODULAR UNIT

BACKGROUND OF THE INVENTION

The present invention relates to a radio transceiver device and in particular, a hand-held transceiver are used as a modular unit.

Both car telephones and hand-held transceivers are now used in the radio telephone networks. The major difference between them is that the car telephone has more output power and therefore requires more noise and spurious response rejection. In this application, the car telephone characteristics described apply equally to hand-held transceivers and their amplifier or booster combinations.

The object of the present invention is to provide a hand-held transceiver having characteristics which do not substantially change when connecting it to an amplifier device. The hand-held transceiver connected to an amplifier has characteristics which are essentially as good as those of car telephones. Another object of the present invention is to provide a hand-held transceiver which may be used in whole or in part, in a modular way as different combinations in connection with amplifying devices.

FIG. 1 shows a prior art device capable of multiple uses. The hand-held transceiver 100 and the amplifying device 200 are connected at the antenna connector A in FIG. 1. The hand-held transceiver is connected to an amplifier or a booster instead of an antenna. In the prior art the duplex filters D divide the transmission and reception frequencies within the amplifier into separate signal paths to be amplified. This prior art device has the disadvantage of being difficult to obtain the characteristics required for hand-held transceivers. The two separate duplex filters between the hand-held transceiver and the booster greatly add to the signal attenuation. The extensive amplifying required for the booster preamplifier requires extensive precautions to suppress spurious response which is difficult to achieve in the high-frequency element. This problem has been partially circumvented by adding the direct voltage input power in the hand-held transceiver. The increased power consumption, however, either shortens the life of the hand-held transceivers, or requires bigger batteries, thus being totally contrary to modern objectives.

The prior art devices must use expensive components for the connections (among others, the filters required by the duplex devices). One of the objectives of the present invention is to provide more economical connections.

SUMMARY OF THE INVENTION

The claimed invention meets these objectives. An interface is formed in the transceiver whereby the amplifier device can be connected in a simple way. This interface enables the optimized dimensions of the amplifying elements in the transceiver and amplifiers, which eliminates the above mentioned higher requirements set for the technical level regarding the noise and spurious resonance levels. To achieve these objectives, the received signal is amplified in the amplifier element, in order to eliminate, e.g., the above mentioned need to increase the current in the amplifier of the high-frequency amplifying element and in order to comply with the requirements of the equipment when the amplifying element is connected to it.

According to the present invention, the transceiver or its base element may also be used as a modular unit with the amplifier device for different purposes.

BRIEF DESCRIPTION OF THE DRAWINGS

The invention is described in the following by reference to preferred embodiments and with references to the accompanying drawings, where.

DESCRIPTION OF THE PREFERRED EMBODIMENTS

Figure 1:
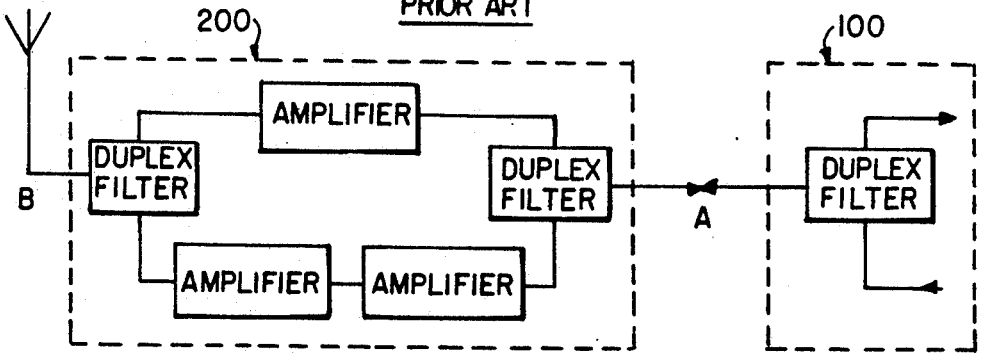
FIG. 1 shows a prior art hand-held transceiver and a connector of the amplifying device.
Figure 2:
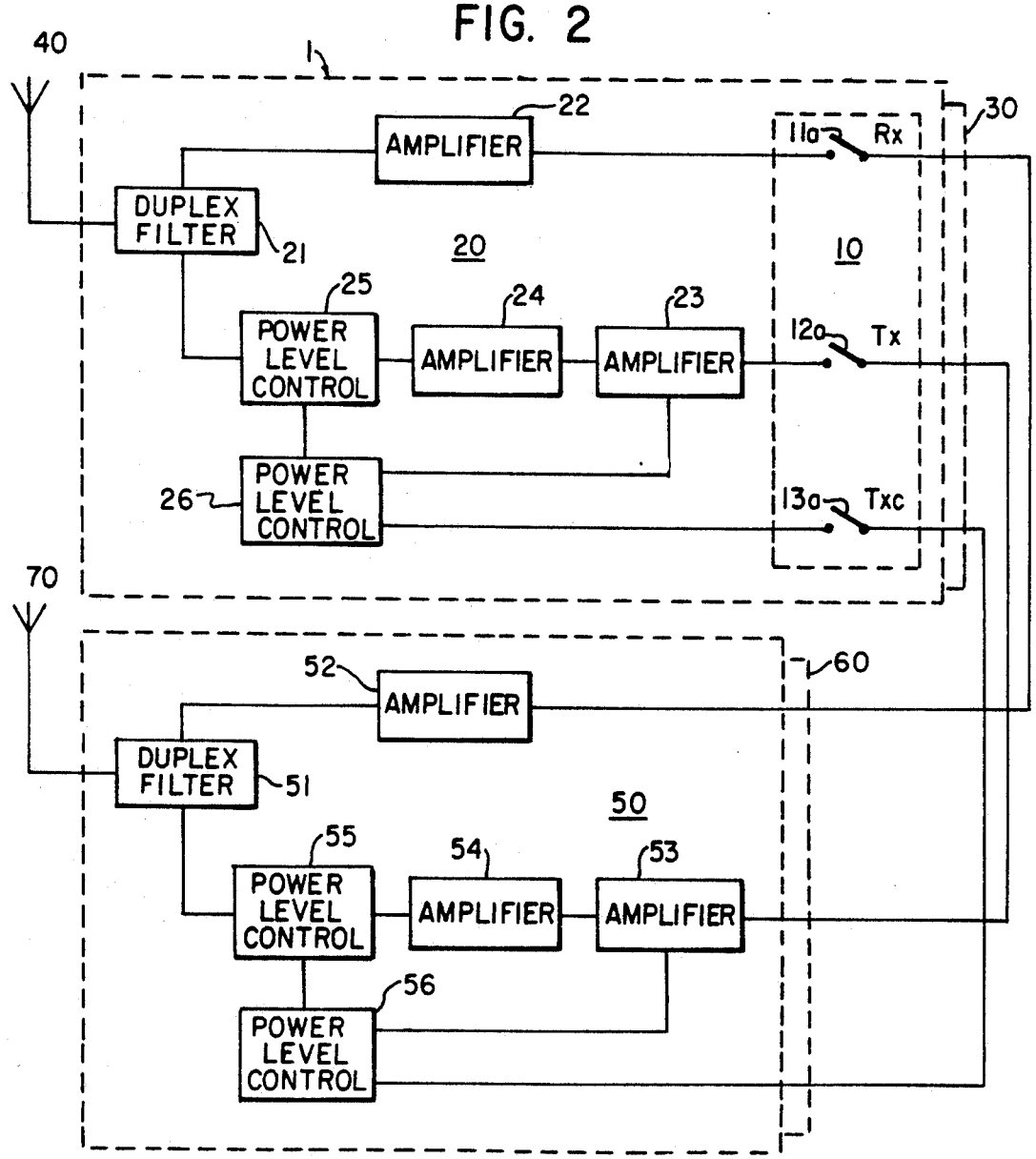
FIG. 2 shows a block diagram of the interface of the base element of the hand-held transceiver according to the present invention and its connection to the amplifier element and the amplifying device.

FIG. 2 shows a radio telephone device comprising a hand-held transceiver 1 connectable to a separate amplifying unit 50. The hand-held transceiver 1 features an antenna connection 40 and may be operated independently as a radio telephone.

The hand-held transceiver 1 comprises the base element 10 and the high-frequency amplifier element 20, between which there is an interface including terminals 11, 12, and 13 for the reception signal Rx, transmission signal Tx and, power level control signal Txc, respectively. The amplifying element includes a duplex filter 21, and input direction amplifier 22, and, in the output direction, amplifiers 23, 24 and the power level control circuits 25, 26. Further structural details of the base element and those of the amplifying element are not described here in detail as they are well known in the art.

The interface signals Rx and Tx may be connected to the amplifying element 20 or to the separate amplifying unit 50, e.g., by the directional switches 11a and 12a in terminals 11, 12 or by power distribution/summing switch solutions (not shown) carried out by passive components. It is possible to switch into the control lines Txc of the transmitter both in series and in parallel at terminal 13. The electric connections of the hand-held transceiver have been concentrated in terminal 30 for the connection of an outer amplifier; inside the hand-held transceiver there is a corresponding connection interface, e.g., in the form of a circuit card connector.

Because the separate amplifying unit element 50 also includes the amplifier 52 of the received signal, the interface can be selected with the signal levels and the high noise immunity requirements in mind. Thus, it can be carried out without any specific and expensive radio frequency (RF) terminals. The interface can be, selected as being of low, middle and/or radio frequency type depending on the necessary application.

Locating the interface between the base element 10 of the hand-held transceiver and the amplifying devices has several technical advantages. The transmission signal Tx level is still low at the terminal 12 because it has not yet been amplified in the amplifying element. On the other hand, the received signal has already been amplified in the amplifying element, before arriving at terminal point 11. Thus, the terminal will charge the hand-held transceiver and its base element as little as possible and the terminals can be selected as advantageous components. In addition, the interface design need not meet rigid requirements, and thus it is possible to consider an assembly where the hand-held transceiver 1 and the separate amplifying unit 50 are located several yards away from each other.

The hand-held transceiver 1 may be connected through terminal 30 to a cable which in turn is connected to terminal 60 of the separate amplifying unit 50. For this Tx, Rx, and Txc cables and other control line wirings are needed. The separate amplifying unit 50 in the circuit diagram of FIG. 2 essentially includes the same elements (51 to 56) as the amplifying element 20 of the hand-held transceiver (those from 21 to 26), although there may be differences in their dimensions, e.g., regarding power levels. The amplifying device also includes an antenna terminal 70.

The separate amplifying unit 50 is preferably a booster amplifier that can be used, in combination with the hand-held transceiver 1, to meet car radio telephone specifications. Alternatively, it is possible to consider that the separate amplifying unit 50 is the amplifying element of the car radio telephone. In this case it is essential that both the booster and the car radio amplifier be structurally and functionally identical whenever the hand-held transceiver according to this invention is used, including the described interface.

According to this invention, the hand-held transceiver 1 can be carried out without the amplifying element 20, i.e., the hand-held transceiver essentially includes just the base element 10 and the terminal 30 when the connecting elements at points 11 and 12 can be left out, if so desired. Such a hand-held transceiver with a solid connection with the separate amplifying unit 50, may be sued as a car telephone.

Using the interface between the hand-held transceiver and the above amplifying element/amplification device described above, it is possible to design and manufacture several modular configurations thus having considerable commercial advantages.

I claim:

1. A radiotelephone device including a hand-held transceiver having a first antenna and an interface, and an amplifying unit having a second antenna, the amplifying unit being separate from, but connectable with, the hand-held transceiver via the interface:

said hand-held transceiver comprising:
    a base element connected to the interface;
    a first duplexer connected to the first antenna;
    a first reception signal chain having an input amplifier, and being connected to the duplexer at one end and to a first hand-held terminal of the interface at another end for enabling the connection of the reception signal chain to said base element;
    a first transmission signal chain having at least an output amplifier, and being connected to the first duplexer at one end and a second hand-held terminal of the interface at another end for enabling the connection of the transmission signal chain to said base element;

said amplifying unit comprising:
    a second duplexer connected to the second antenna;
    a second reception signal chain having a second input amplifier, and being connected to the second duplexer at one end, and to a first amplifying unit terminal of the interface at another end; and
    a second transmission signal chain having at least a second output amplifier, and being connected to the second duplexer at one end and to a second amplifying unit terminal of the interface at another end; and wherein said base element is selectively connected to the first and second hand-held terminals when the amplifying unit is not connected to the hand-held transceiver via the interface such that the first reception and transmission signal chains are connected to the base element, and connected to the first and second amplifying unit terminals when the amplifying unit is connected to the hand-held transceiver via the interface such that the second reception and transmission signal chains are connected to the base element.

2. The device of claim 1, wherein the interface includes at least two switches for selectively connecting the base element between the first and second hand-held terminals and the first and second amplifying unit terminals.

3. The device of claim 1, wherein
    the hand-held transceiver includes a first power level control signal chain having power level controls, said first power level control signal chain being connectible at one end to a third hand-held terminal of the interface for enabling the connection of the power level control signal chain to the base element and connected to the transmission signal chain at another end; and
    the amplifying unit has a second power level control signal chain having a second power level control, said second power level control signal chain being connectible at one end to a third amplifying unit terminal of the interface and connected to the second transmission signal chain at another end; and
    the hand-held is selectively connected to the third base unit terminal when the amplifying unit is not connected to the hand-held transceiver via the interface, and connected to the third amplifying unit terminal when the amplifying unit is connected to the hand-held transceiver via the interface.

4. The device of claims 1, 2, or 3, wherein the amplifying unit is a booster amplifier.

5. The device of claims 1, 2, or 3, wherein the amplifying unit is part of a car telephone.

6. The device of claim 5, wherein the input amplifier and the second input amplifier are substantially identical, and the output amplifier and the second output amplifier are substantially identical.

7. The device of claim 6, wherein the separate amplifier unit may be connected to a hand-held transceiver without the first reception and transmission signal chains.

8. The device of claim 1, wherein reception and transmission signals are radio frequency signals.

* * * * *